United States Patent [19]

Stanley et al.

[11] Patent Number: 4,560,258
[45] Date of Patent: Dec. 24, 1985

[54] SPECTACLES WITH EXTRACTABLE TEMPLES

[75] Inventors: Smith B. Stanley, Brooklyn; Yoram A. Alroy, New York, both of N.Y.

[73] Assignee: Alroy & Stanley Associates, Inc., New York, N.Y.

[21] Appl. No.: 526,116

[22] Filed: Aug. 24, 1983

[51] Int. Cl.$^4$ .......................... G02C 5/20; G02C 9/02; G02C 5/14
[52] U.S. Cl. ..................................... 351/115; 351/59; 351/120; 351/153
[58] Field of Search .................. 351/59, 115, 120, 121, 351/128, 153, 63, 47, 51, 52

[56] References Cited

U.S. PATENT DOCUMENTS

| 1,748,771 | 2/1930 | Howell | 351/115 |
|---|---|---|---|
| 1,926,649 | 9/1933 | Reinhold . | |
| 2,032,139 | 2/1936 | Macy . | |
| 2,322,393 | 6/1943 | Richardson et al. . | |
| 2,323,518 | 7/1943 | Cochran . | |
| 2,714,448 | 8/1955 | Brown . | |
| 2,824,308 | 2/1958 | Duncan . | |
| 3,441,341 | 4/1969 | Dunn . | |
| 3,689,136 | 9/1972 | Atamian . | |
| 4,012,130 | 3/1977 | Guillet . | |

FOREIGN PATENT DOCUMENTS 879623 3/1943 France .................................. 351/41

Primary Examiner—Rodney B. Bovernick
Attorney, Agent, or Firm—Karl F. Ross; Herbert Dubno

[57] ABSTRACT

A pair of spectacles, preferably in the form of a card bearing advertising, decorative or promotional material, has a channel formed in the frame and receiving a pair of temples which can be retracted and swung into a position in which they lie transverse to the frame to bring them into the position of use.

11 Claims, 8 Drawing Figures

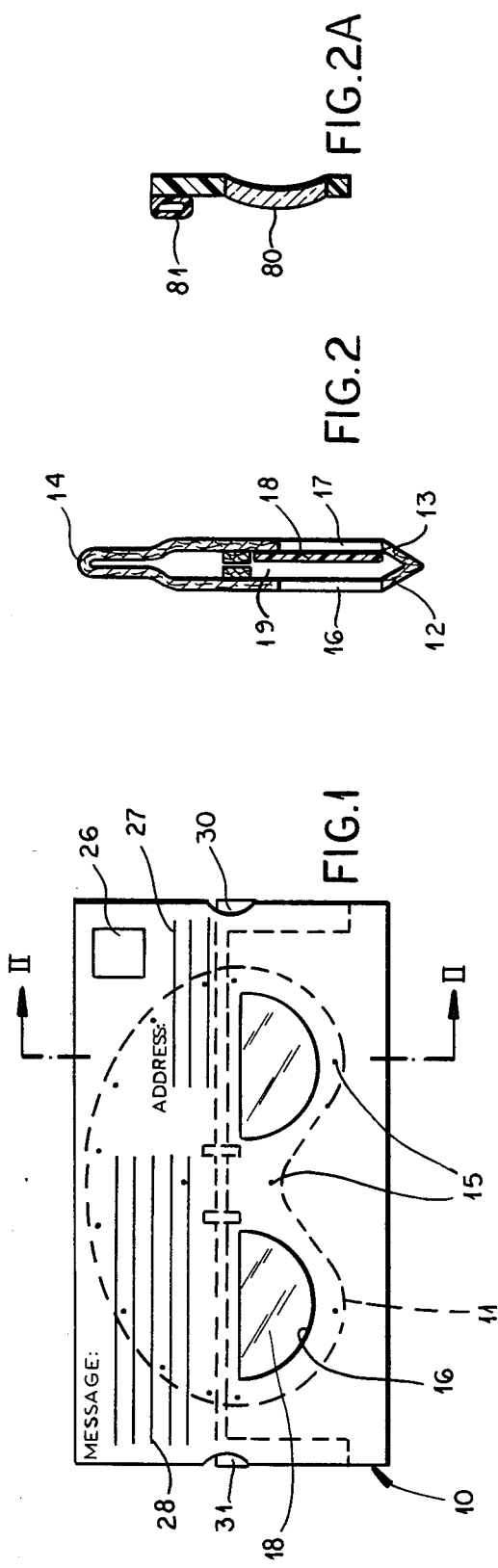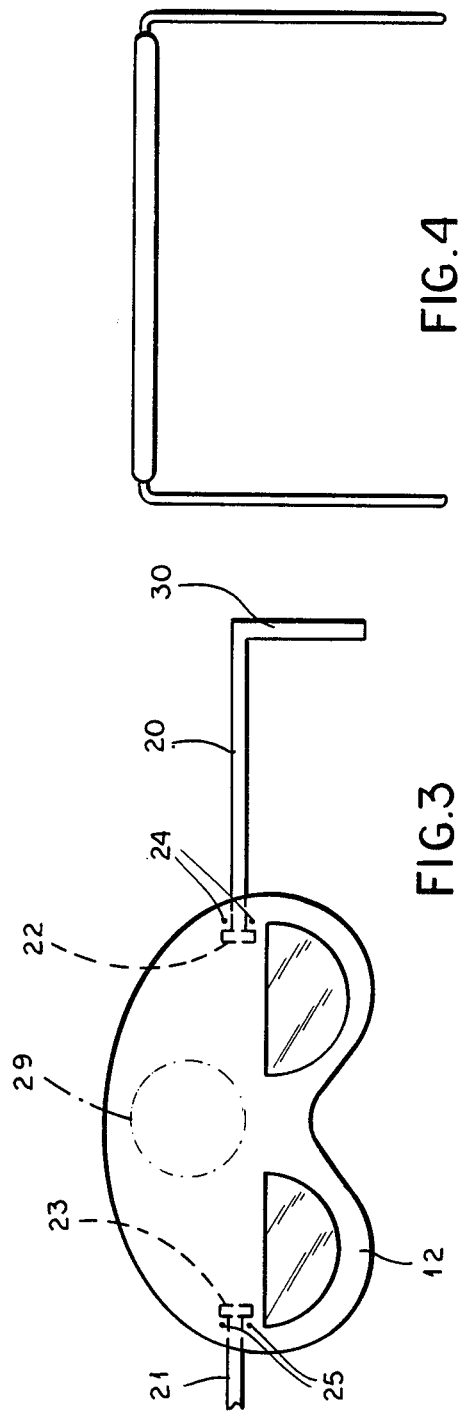

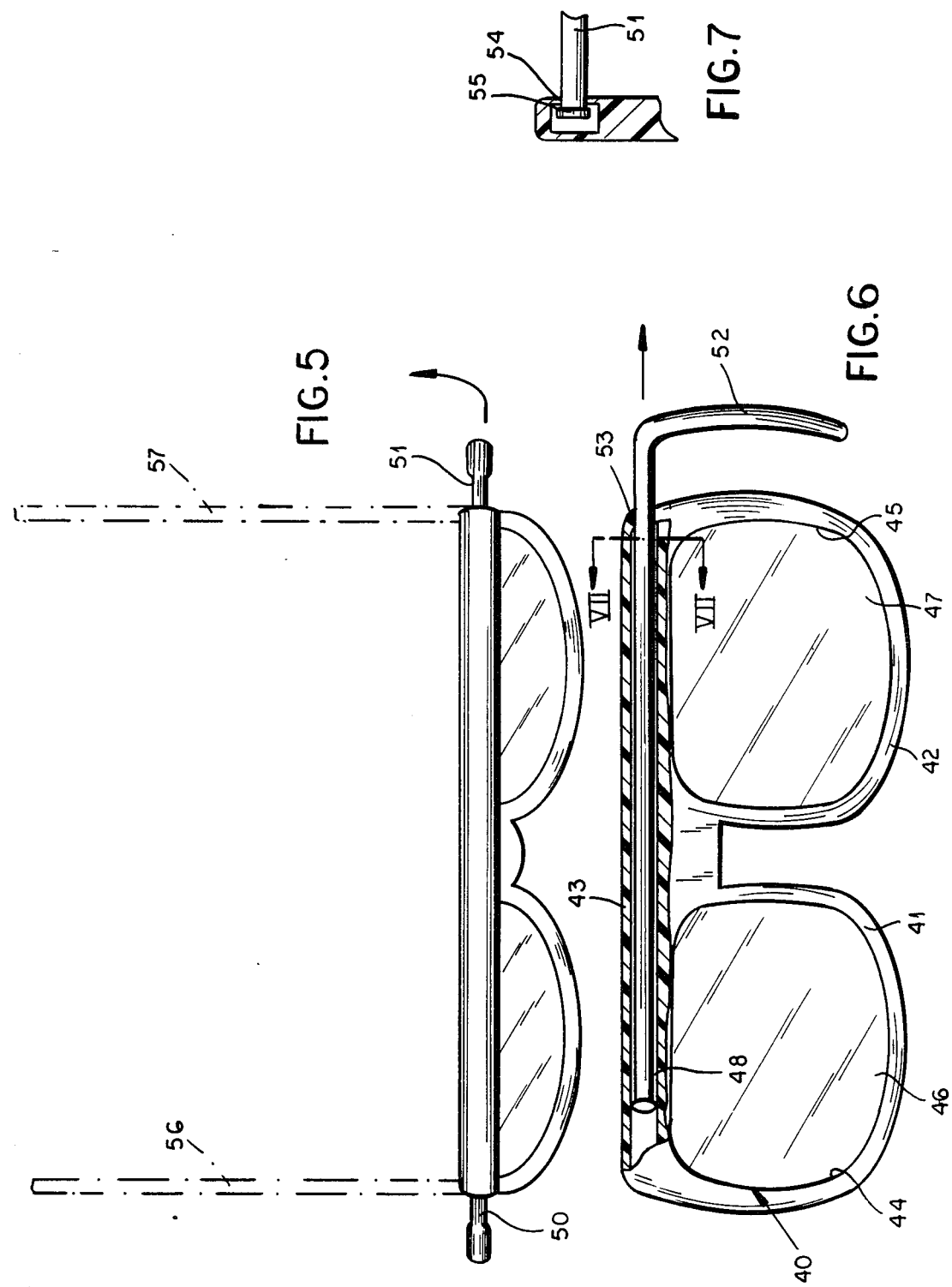

SPECTACLES WITH EXTRACTABLE TEMPLES

FIELD OF THE INVENTION

Our present invention relates to spectacles with extractable temples and, more particularly, to eyeglasses, sunglasses, steroscopic-viewing glasses, polarized-lens glasses, eye-protective glasses, and the like, hereinafter referred to broadly as spectacles, composed of long-life or short-lived materials for repeated use or single-use applications for retention or disposal, and utilizing glass, or synthetic-resin (plastic) lenses, and which can be supplied or stored in a compact configuration whereby a temple is at least partly received in the bridgepiece between lenses.

In a particular aspect of the invention, the spectacles are provided in a flat-card form enabling legible matter to be placed thereon, e.g. as a novelty item.

BACKGROUND OF THE INVENTION

The usual pair of spectacles, as this term has been defined above, comprises a frame which may have a bridgepiece interconnecting a pair of window-forming portions which can be provided with respective lenses, with a respective temple being pivotally connected to each of these portions and formed with an earpiece.

When the spectacles are worn, the frame is supported on the nose of the wearer by the bridgepiece, the lenses are located in front of the eyes, and the temples extend rearwardly along the sides of the head and may engage, e.g. with the earpieces, behind the ears of the wearer.

Spectacles have been provided for a wide variety of purposes only some of which need be alluded to here. For example, they may be provided as ordinary eyeglassss with corrective lenses or lenses intended to assist in normal vision, either fabricated specially for the user or to provide magnification or some other special effect.

Sunglasses, for example, may be used as filters or attenuators to protect the eyes from the sun, while stereoscopic glasses may be used to provide three-dimensional illusions in viewing three-dimensional displays in which two distinct images are created by polarized light or color effects.

Spectacles may also be used to protect the eyes against vapors, the spattering of liquids and flying particulates.

For conventional frames, synthetic resin materials may be used or other materials such as wire and metals can be employed in whole or in part. Disposable or single-use spectacles, e.g. as sunglasses or for viewing three-dimensional motion pictures may be distributed widely at low cost and may utilize materials such as cardboard or paperboard.

In recent years a compact construction has been desired. In the standard mode of use, the temples of a pair of spectacles are permanently hinged at the outer ends of the frame to allow the temples to be swung inwardly and enable the folded pair of glasses to be inserted into a standard sleeve, into a pocket or otherwise stored. Sometimes a hinge or flexible connection is provided at the bridge piece to enable the spectacles to be somewhat more compact.

While these systems have proved to be relatively compact, they invariably are somewhat bulky and it is desirable in some cases to provide an extremely flat construction.

We have attempted to ascertain earlier developments in this respect and in doing so have come across the following U.S. patents which may be material:
U.S. Pat. No. 1,926,649,
U.S. Pat. No. 2,032,139,
U.S. Pat. No. 2,322,393,
U.S. Pat. No. 2,323,518,
U.S. Pat. No. 2,714,448,
U.S. Pat. No. 2,824,308,
U.S. Pat. No. 3,441,341,
U.S. Pat. No. 3,689,136.

OBJECTS OF THE INVENTION

It is the principal object of our present invention to provide an improved spectacle structure which has a flatter configuration than earlier spectacles but which nevertheless has greater versatility.

Still another object of the invention is to provide a simple, flat, compact spectacle construction avoiding disadvantages of prior art systems.

Yet a further object of our invention is to provide a readily printable novelty item which, at low cost, can be utilized to enable spectacle use.

SUMMARY OF THE INVENTION

These objects and others which will become more readily apparent hereinafter are attained, in accordance with our invention, in which we provide a flattened spectacle frame provide with at least one longitudinal channel extending across the lens-receiving portion of the frame and through a bridgepiece thereof while opening at an end of the frame to enable a temple to be at least in part retracted from this channel and to be swung into a position of use in which this temple lies substantially transverse to the plane of the frame and the channel.

Generally the channel will accommodate two such temples, each of which can be extended from the channel in a respective direction generally linearly before the temple is swung into its use position.

This arrangement has the advantage that the temples are largely received within the frame while the latter retains its flat and preferable planar construction, without requiring folding of the temples or even telescoping of various sections of a temple into one another, systems which increase the complexity of manufacture and use. While the invention is applicable to the use of any materials, it can be carried out utilizing temples of plastics material, wire and other materials which are commonly utilized in spectacles. The invention especially enables paperboard or cardboard to be used as will be apparent below.

According to a feature of the invention, each temple is provided with an earpiece which may continue to project when the temple is otherwise received in the respective channel so that the earpiece can serve as a holder enabling the temple to be extended from the channel.

Alternatively, the earpiece may be partly received within the frame in a more compact construction.

The free end of the temple remote from the earpiece can be shape, e.g. with a head or transverse formation, to prevent the shank of the temple from being fully extracted from the channel.

According to another aspect of the invention, the spectacles are formed as a card or sheet from which the frame can be separated, e.g. along perforations or scoring, with the temples likewise composed of a sheet material being then retracted from the frame to bend and fit around the head of the wearer.

This card can bear conventional indicia. For example, if it is to popularize some aspect of an event, e.g. the Olympic Games, the spectacles can be sunglasses provided with ultraviolet-absorbing or other light-absorbing lenses which may be light-polarizing filters, if desired, and the spectacles may bear some symbol of the Olympic Games or of some aspect thereof. This symbol can be exposed when the spectacles are worn. The other side of the card and, possibly other side of the spectacles, can bear other indicia, e.g. symbols for message, address and stamp, if the card is intended for use as a postal card. The card itself can be formed by folding a paperboard or cardboard sheet to define the channel receiving the temples. The temples and the card, including the openings over which the transparent acetate foils are fixed, can be formed by die stamping or cutting in a conventional manner.

BRIEF DESCRIPTION OF THE DRAWING

The above and other objects, features and advantages of the present invention will become more readily apparent from the following description, reference being made to the accompanying drawing in which:

FIG. 1 is a plan view of a card from which spectacles according to the invention can be separated;

FIG. 2 is a cross sectional view generally taken along the line II—II of FIG. 1;

FIG. 2A is a cross section through another embodiment;

FIG. 3 is a view of the opposite side of the spectacles after they have been separated from the card;

FIG. 4 is a top view of the spectacles showing the bending of the temples after they have been extracted from the channel;

FIG. 5 is a top view of another pair of spectacles utilizing the principles of the invention and showing the temples retracted in solid lines, but extended in a dot-dash view;

FIG. 6 is a front-elevational view, partly broken away of the spectacles; and

FIG. 7 is a detail view in section along the line VII—VII of FIG. 6.

SPECIFIC DESCRIPTION

As can be seen from FIG. 1, a pair of spectacles may be defined in a card 10 by scoring 11 delineating a frame 12. The card 10 is formed by folding a sheet of paperboard, after die cutting thereof, so that a pair of layers 12 and 13 lie parallel to one another and extend codirectionally from a fold 14. The layers are held together by sealing points represented at 15 and are provided with windows 16 and 17, each of which is closed internally by a panel 18 of colored transparent acetate foil to form a sunglasses lens.

The folded over sheet defines a channel 19 in which a pair of temples 20, 21 can be disposed one behind the other, each of these temples being formed with an enlarged head 22, 23 which is prevented from being fully extracted from the channel by a pair of sealing points 24, 25 at the respective side of the frame 12.

The exposed surface of the card 10 seen in FIG. 1 can be provided with indicia, such as a printed field 26 for a postage stamp, a printed field 27 for an address, and a printed field 28 for an appropriate message. When the card is used as a postcard, the recipient can simply separate the spectacles from the remainder of the card along the score lines or perforations 11 and utilize the spectacles for the intended purpose, i.e. for sunglasses in the case illustrated.

Naturally, instead of the printed indicia represented in FIG. 1, the card can be provided with advertising messages or the like.

The reverse field of the card can also bear indicia, e.g. as presented at 29 which can serve as a symbolic representation of an event, a place or some reminder which can remain on the frame 15 of the sunglasses and can be displayed, e.g. as an advertising message carried by the wearer or merely for decorative purposes.

The temples 20, 21 can be provided with earpieces 30, 31 which may be lodged between the leaves of the folded product as shown in FIG. 1.

When the spectacles have been separated from the rest of the card (FIG. 3), the temples can be drawn out into the position shown and then bent rearwardly at FIG. 4 to the normal position of such temples embracing the head of the user.

In FIGS. 5-7, we have shown another embodiment in which the generally flat character of the spectacles is retained.

In this embodiment, the frame 40 can comprise a pair of lense-receiving portions 41 and 42 interconnected by a bridgepiece 43, molded rigid therewith. The portions 41 and 42 are provided with windows 44, 45 each of which receives a lens 46, 47. In this embodiment, a channel 48 is provided in the linear rigid member formed by the upper parts of members 41 and 42 and by the bridgepiece 43. While a common channel is utilized to receive the two temples 50 and 51 (only one of which is shown in FIG. 6 and 7), it will be understood that separate channels can also be employed, if desired. Each of the temples 50, 51, is formed with an earpiece 52 and projects through a passage 53 at the respective end of the frame so that the temple can be retraced through this passage and swung into a rearwardly open slot 54 (FIG. 7), the retraction being limited by an enlarged head 55 at the end of the temple.

Thus in the retracted position shown in FIGS. 5 and 6 in solid lines, the temples are practically completely received within the channel and only the earpieces 52 remain exposed and are coplanar substantially with the balance of the frame. When, however, the temples are retracted, they can be swung into the normal use position shown in dot-dash lines at 56 and 57 to engage the head of the wearer. It is also possible in both of the embodiments described to form the channels from a tubular member 81 (FIG. 2A) which can be applied to the frame element 80, e.g. by heat sealing, adhesive bonding or other conventional means.

We claim:

1. A pair of spectacles comprising:
   a frame having a pair of lens-receiving portions rigidly interconnected by a bridgepiece, said frame being provided with a channel extending across said portions and said bridgepiece; and
   a pair of temples mounted on said frame, at least one of said temples being slidably received in said channel, and being of a length received in said channel so as to be withdrawn therefrom upon extension from said channel, and having a shank which is extractable from said channel and swingable into a position wherein said one of said temples lies generally transversely to a plane of said frame and said channel.

2. A pair of spectacles defined in claim 1 wherein each of said temples is accommodated in said channel and is swingable into a use position transverse to said plane upon extension of said temples from said channel.

3. The pair of spectacles defined in claim 2 wherein each of said temples is formed with an earpiece engageable behind the ear of a wearer and, at an end remote from the respective earpiece, with a respective enlargement resisting withdrawal of the respective temple from the channel.

4. The pair of spectacles defined in claim 1 wherein said frame is composed of a sheet material.

5. The pair of spectacles defined in claim 4 wherein said frame is separated by scoring from the balance of a card of said sheet material and said portions are provided with plastic lenses.

6. The pair of spectacles defined in claim 5 wherein said channel is formed by folding over said sheet material.

7. The pair of spectacles as defined in claim 5 wherein said card bears indicia for use in postal services.

8. The pair of spectacles as defined in claim 6 wherein said temples are composed of sheet material and are received between leaves of the folded material of said frame.

9. The pair of spectacles defined in claim 4 wherein said temples are composed of sheet material.

10. The pair of spectacles defined in claim 4, further comprising decorative indicia printed on said frame.

11. The pair of spectacles defined in claim 1 wherein the frame comprises a frame member and a channel member bonded to said frame member and defining said channel.

* * * * *